UNITED STATES PATENT OFFICE.

BERNARD F. ERDAHL, OF DULUTH, MINNESOTA.

METHOD OF PRODUCING GELLING METAL ALGINATES AND PRODUCT DERIVED THEREFROM.

1,415,849.     Specification of Letters Patent.     Patented May 9, 1922.

No Drawing.     Application filed September 30, 1920. Serial No. 413,932.

*To all whom it may concern:*

Be it known that I, BERNARD F. ERDAHL, a citizen of the United States, residing at Duluth, in the county of St. Louis and State of Minnesota, have invented certain new and useful Improvements in Methods of Producing Gelling Metal Alginates and Product Derived Therefrom, of which the following is a specification.

My invention relates to the preparation of a substance adapted to render concrete resistant to water charged with soluble compounds for example, alkali and magnesium sulfates.

The object of this invention is the preparation of a gelling alginate adapted to form on the walls of the capillaries present in concrete a film having the following specifications:

(1) a fair tensile strength (cohesiveness),
(2) capable of adhering to the walls of the capillaries,
(3) insoluble in waters charged with soluble substances, mainly alkali compounds,
(4) adapted to form a continuous or non-porous coating, and
(5) not interfering in any marked degree with the strength of the concrete.

The production of gelling alginates of the metals may be accomplished by treating compounds of the metals with an algin base and thereafter adding a substance capable of transforming the reaction-product into a colloidal alginate-gel of the metals.

The production of a gelling alginate has heretofore been impossible. I have found that a gelling alginate possessing the specifications heretofore enumerated may be prepared in the manner hereinafter set forth.

As an example, the preparation of the gelling ammonio-alginate of iron, will be given, but it is understood my invention is not limited thereto, but is suitable for the preparation of other gelling alginates of the metals.

A cold solution of an alginate base, preferably sodium alginate, is treated with a cold solution of ferric chloride, forming a precipitate of iron alginate. This precipitate is impregnated with impurities, the chlorides of iron and sodium, derived from the precipitating operation, and unless the impurities are removed the preparation of a gelling ammonio-alginate is impossible.

If a cold ammonia solution is added to the impure alginate of iron the substance will not form a gel, lacking cohesion and adhesiveness and crumbling to an insoluble dust on drying. Such a substance will not form a film having specifications (1) and (2).

A gelling ammonio-iron alginate having such qualities is formed if all reactions take place in the cold and the iron alginate is chemically pure. To comply therewith, before the addition of ammonia the iron alginate is washed thoroughly until all traces of iron and sodium chlorides are removed and all reactions, as indicated, are effected in the cold preferably at a temperature between 32 and 50° F. The elimination of the impurities satisfies specification (4), since it eliminates soluble salts, the presence of which in the film coating the walls of the concrete-capillaries prevents a non-porous coating.

In this connection it may be stated that faulty preparation of the colloidal ammonio-metal-alginate-gel will show its effect in the dried film not being continuous or non-porous. The ever-present free lime in the cement of the concrete partially remedies this by forming with the mixing water a solution of calcium hydroxid capable of reacting with small amounts of free alginic acid forming an impermeable calcium alginate which together with the ammonia metal-alginate aids in remedying the defects of faulty preparation. As a further aid in offsetting any defects in the preparation and to serve as an additive measure further fortifying the impermeability of the film, a suitable amount of wax, for example, beeswax, is dissolved in an adequate amount of an alcohol of the $C_nH_{2n+2}O_3$ series, preferably gycerin. The resultant solution treated with ammonia forms a water-soluble or miscible emulsion. Upon the addition to concrete of the gelling ammonio-metal-alginates, carrying incorporated therein the fortifying agent, the water solution of calcium hydroxid present in the concrete reacts with the fortifying agent to form an insoluble calcium soap, thus closing the eventual pores in the alginate film and making it impermeable.

It is also of importance that any excess ammonia be removed from the ammonia-alginate of iron by a thorough drying. The strength and insolubility of the compound is improved by such a substantially complete removal.

Other gelling alginates may be formed by treating an algin base with a suitable metal compound and adding to the reaction-product a gelling substance. For example, gelling aluminum or copper alginates may be formed by treating an algin base with a suitable aluminum or copper compound, preferably aluminum or copper chloride and adding thereto a gelling agent. The invention is not limited to the use of ammonia as a gelling agent as other substances are capable of effecting the colloidal condition provided the reactions take place in the cold and the substance reacting with the gelling agent is chemically pure.

The product resulting from the series of steps indicated complies with the specifications set forth, and renders concrete substantially completely resistant to water charged with soluble compounds detrimental to the concrete.

The alginates as ordinarily prepared do not possess a true film quality. The alginates prepared by treating an algin base such as sodium alginate with iron, aluminum or copper chlorids or products resulting from the treatment of sodium alginate with an acid do form a jelly, but this is not a colloidal gel in the sense in which the term is understood by those skilled in the art. The jelly referred to is very coarse grained, non-adhesive and lacks cohesiveness, crumbling on drying to a fine powder. In addition, such alginates, due to their method of preparation, are contaminated with impurities. Such a product is obviously incapable of making concrete alkali-resistant.

The process of rendering concrete resistant to waters charged with soluble compounds deterimental to the concrete by coating the concrete-capillaries with a colloidal metal alginate is claimed in my copending application, Serial No. 493931 filed September 30, 1920.

I claim:

1. The method of producing a gelling metal-alginate comprising treating a metal compound with sodium alginate eliminating the impurities from the reaction-product, and thereafter adding a substance capable of transforming the reaction-product into a colloidal alginate-metal-gel, all the reactions being performed in the cold.

2. The method of producing a gelling ammonio-metal-alginate comprising treating a metal compound with sodium alginate eliminating the impurities from reaction-product, and thereafter adding an ammonium compound capable of transforming the reaction-product into a colloidal ammonio-metal-alginate-gel, all the reaction being performed in the cold.

3. The method of producing a gelling ammonio-metal-alginate comprising treating a metal compound with sodium alginate eliminating the impurities from the reaction product, and thereafter adding ammonia to transform the reaction-product into a colloidal ammonio-metal-alginate-gel, all the reactions being performed in the cold.

4. The method of producing a gelling metal-alginate comprising treating a metal compound with an algin base, eliminating the impurities from the reaction-product, and thereafter adding a substance capable of transforming the reaction-product into a colloidal alginate-metal-gel, all of the reactions being performed in the cold.

5. The method of producing a gelling ammonio-metal-alginate comprising treating a metal compound with an algin base, eliminating the impurities from the reaction-product, and thereafter adding an ammonia compound capable of transforming the reaction product into a colloidal ammonio-metal-alginate-gel, all of the reactions being performed in the cold.

6. A method of fortifying colloidal alginates comprising adding thereto an emulsion of wax dissolved in an alcohol of the $C_nH_{2n+2}O_3$ series, and thereafter treating with a metallic compound to form a metallic soap.

7. A method of fortifying colloidal alginates comprising adding thereto an emulsion of wax dissolved in glycerine, and thereafter treating with a metallic compound to incorporate in the alginate a metallic soap.

8. A method of fortifying colloidal metal alginates comprising mixing therewith a metallic soap.

9. A method of fortifying metal alginates comprising treating the same with a solution of calcium hydroxid.

10. A method of fortifying colloidal metal alginates comprising treating the same with calcium hydroxid.

11. A method of producing a fortified gelling ammonio-metal-alginate comprising treating a metal compound with an algin base, eliminating the impurities from the reaction-product, adding thereto an ammonia compound capable of transforming the reaction-product into collodial ammonio-metal-alginate-gel, all the reactions being performed in the cold, and thereafter adding a solution of calcium hyroxid to fortify the alginate.

12. As a new product, a colloidal algin-gel.

13. As a new product, a colloidal alginate-gel.

14. As a new product, a colloidal metal-alginate-gel.

15. As a new product, a colloidal ammonio-metal-alginate-gel.

16. As a new product, fortified colloidal algin-gel.

17. As a new product, fortified colloidal ammonio-metal-alginate-gel.

18. As a new product, colloidal algin having incorporated therein a metallic soap.

19. As a new product, colloidal ammonio-metal-alginate having incorporated therein a metallic soap.

20. A method of fortifying colloidal alginate-gels comprising adding thereto an emulsion of wax dissolved in an alcohol of the $C_nH_{2n+2}O_3$ series, and thereafter treating with metallic compounds to form a metallic soap.

21. A method of fortifying colloidal alginate-gels comprising adding thereto an emulsion of wax dissolved in glycerine and thereafter treating with metallic compounds to incorporate in the alginate-gel a metallic soap.

22. A method of fortifying colloidal metal alginate-gels comprising mixing therewith a metallic soap.

23. The method of producing a gelling metal-alginate comprising treating a metal compound with an algin base, eliminating the impurities from the reaction-product, and thereafter adding a substance capable of transforming the reaction-product into a colloidal alginate-metal-gel, all the reaction being performed at a temperature between 32 and 50° F.

24. The method of producing a gelling metal-alginate comprising treating a metal compound with sodium alginate, eliminating the impurities from the reaction-product, and thereafter adding a substance capable of transforming the reaction-product into a colloidal alginate-metal-gel, all the reactions being performed at a temperature between 32 and 50° F.

25. The method of producing a gelling ammonio-metal-alginate comprising treating a metal compound with sodium alginate, eliminating the impurities from the reaction-product, and thereafter adding an ammonium compound capable of transforming the reaction-product into a colloidal ammonio-metal-alginate-gel, all the reactions being performed at a temperature between 32 and 50° F.

In testimony whereof I affix my signature.

BERNARD F. ERDAHL.